US012734546B2

(12) United States Patent
Liu et al.

(10) Patent No.: US 12,734,546 B2
(45) Date of Patent: Sep. 15, 2026

(54) COATING EQUIPMENT

(71) Applicant: CONTEMPORARY AMPEREX TECHNOLOGY (HONG KONG) LIMITED, Hong Kong (CN)

(72) Inventors: Xuyong Liu, Ningde (CN); Hongwu Shang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 455 days.

(21) Appl. No.: 18/384,382

(22) Filed: Oct. 27, 2023

(65) Prior Publication Data

US 2024/0165655 A1 May 23, 2024

Related U.S. Application Data

(63) Continuation of application No. PCT/CN2023/070528, filed on Jan. 4, 2023.

(30) Foreign Application Priority Data

Nov. 21, 2022 (CN) ......................... 202223079806.3

(51) Int. Cl.
*B05C 11/10* (2006.01)
*B05C 5/02* (2006.01)

(52) U.S. Cl.
CPC ........ *B05C 11/1018* (2013.01); *B05C 5/0254* (2013.01)

(58) Field of Classification Search
CPC .......................... B05C 11/1018; B05C 5/0254
See application file for complete search history.

(56) References Cited

U.S. PATENT DOCUMENTS 6,863,730 B2 * 3/2005 Trabold .............. B05C 11/1015 118/712

FOREIGN PATENT DOCUMENTS

| | | | | |
|---|---|---|---|---|
| CN | 206731444 | U | | 12/2017 |
| CN | 212681501 | U | | 3/2021 |
| CN | 112916326 | A | | 6/2021 |
| CN | 213792486 | U | | 7/2021 |
| CN | 215141487 | U | | 12/2021 |
| CN | 216323035 | U | | 4/2022 |
| CN | 216988369 | U | | 7/2022 |
| JP | 2005000883 | A | * | 1/2005 |
| JP | 2006-088000 | A | | 4/2006 |
| JP | 2014-151301 | A | | 8/2014 |

OTHER PUBLICATIONS

Intention to Grant issued Nov. 18, 2025 in European Patent Application No. 23 754 100.8, 49 pages.

(Continued)

*Primary Examiner* — James M Mellott
(74) *Attorney, Agent, or Firm* — XSENSUS LLP

(57) ABSTRACT

Disclosed is a coating equipment. The coating equipment may include a back roll, a coating die head, and a detection assembly. The coating die head may have a coating opening facing towards the back roll, and the coating opening may extend in an axial direction of the back roll. The detection assembly may be configured to detect a position of the coating die head relative to the back roll. The detection assembly may include a level mounted on the coating die head.

7 Claims, 4 Drawing Sheets

(56) References Cited

OTHER PUBLICATIONS

Extended European Search Report issued Aug. 29, 2024 in European Patent Application No. 23754100.8.
Office Action issued Jun. 24, 2025 in European Patent Application No. 23754100.8.
International Search Report and Written Opinion mailed on Jul. 21, 2023, received for PCT Application PCT/CN2023/070528, filed on Jan. 4, 2023, 14 pages including English Translation.

* cited by examiner

COATING EQUIPMENT

CROSS-REFERENCE TO RELATED APPLICATIONS

This application is a continuation of International Application No. PCT/CN2023/070528, filed Jan. 4, 2023, which claims priority to Chinese Patent Application No. 202223079806.3, filed with the China National Intellectual Property Administration (CNIPA) on Nov. 21, 2022, the entire contents of all of each are incorporated herein by reference.

TECHNICAL FIELD

This application relates to the technical field of batteries, and in particular, to a coating equipment.

BACKGROUND

Batteries are widely applied to various kinds of electrical equipment, such as music players, video cameras, portable computers, and electric vehicles. A coating process is an indispensable part of the manufacturing process of batteries. Coating weight is closely related to electrical equipment. The main structural part used in the coating process includes a coating die head and a back roll, and a base material is wound on the back roll in the coating process. Due to the influence of various environmental factors, the position of the coating die head relative to the back roll often changes in the production process. How to detect the position change of the coating die head relative to the back roll is an urgent problem to be solved.

SUMMARY

This application provides coating equipment, which can solve the problem of poor coating stability caused by the fact that a gap and a parallelism of a coating die head relative to a back roll exceed specifications.

The coating equipment according to embodiments of this application includes:

- a back roll;
- a coating die head, having a coating opening facing towards the back roll, the coating opening extending in an axial direction of the back roll; and
- a detection assembly, configured to detect a position of the coating die head relative to the back roll and including a level mounted on the coating die head.

In the coating equipment provided by the embodiments of this application, through the level arranged on the detection assembly, the position change of the coating die head relative to the back roll can be detected in real time.

In some embodiments, the detection assembly includes a range finder. The range finder is configured to detect a parallelism between a center line of the coating opening and a central axis of the back roll.

In this way, the range finder can indirectly obtain the parallelism of the coating equipment relative to the back roll by detecting the parallelism between the center line of the coating opening and the central axis of the back roll. Compared with a method for detecting the parallelism of other positions, this measuring method has higher accuracy, is simple and convenient to operate, and can reduce the error during measurement and improve the measurement efficiency.

In some embodiments, the range finder is arranged on the coating die head, and the range finder determines the parallelism by detecting a distance between the back roll and the range finder.

In this way, the range finder can detect the parallelism of the coating die head relative to the back roll. When the parallelism is not within a tolerance range, a maintainer can perform maintenance in time, thereby ensuring the coating stability and ensuring the normal operation of production.

In some embodiments, the range finder and the level are respectively located in different directions of the coating die head.

In this way, the range finder and the level are respectively arranged in different directions of the coating die head, so that interference between the range finder and the level can be avoided, and measurement accuracy can be ensured.

In some embodiments, the range finder is arranged on an end part in a length direction of the coating die head, the level is parallel to the length direction of the coating die head, and the level is mounted on a surface in the length direction of the coating die head.

In this way, the range finder is arranged on the end part in the length direction of the coating die head, and the level is arranged to be parallel to the length direction of the coaling die head. This design makes the distance between the range finder and the level farthest and facilitates the subsequent maintenance of the range finder and the level, thereby avoiding interference between the range tinder and the level and ensuring measurement accuracy.

In some embodiments, the range finder is further configured to detect a gap between the coating opening and the back roll.

In this way, the range finder detects the gap between the coating opening and the back roll. When the gap between the back roll and the coating opening exceeds the specification, a maintainer can perform maintenance in time, thereby ensuring the coating stability and ensuring the normal operation of production.

In some embodiments, the coating equipment includes an adjusting mechanism connected to the coating die head. The adjusting mechanism is configured to adjust the position of the coating die head.

In this way, when the detection assembly detects that the position of the coating die head relative to the back roll exceeds the specification, the adjusting mechanism may be configured to adjust the position of the coating die head, so that the position of the coating die head relative to the back roll returns to the specification, thereby ensuring the coating stability and ensuring the normal operation of production.

In some embodiments, the coating equipment includes a machine frame and a bearing plate. The coating die head is mounted on the bearing plate. The adjusting mechanism is mounted on the machine frame and is connected to the bearing plate. The adjusting mechanism adjusts a degree of freedom in at least one direction of the bearing plate to adjust a degree of freedom of the coating die head.

In this way, compared with the method of directly mounting the adjusting mechanism on the coating die head, the adjusting mechanism is arranged on the bearing plate, and can adjust the degree of freedom of the coating die head without changing the original structure of the coating die head.

In some embodiments, the adjusting mechanism includes at least one of a threaded piece and an automatic control system that are connected to the bearing plate.

In this way, the threaded piece may be adjusted manually and conveniently, and the manufacturing cost is low. The automatic control system may adjust the position of the coating die head in real time. The automatic control system is more efficient and can ensure the normal operation of production to the greatest extent.

The above description is merely an overview of the technical solution of this application. To make the technical means of this application more comprehensible and implemented in accordance with the content of the specification and to make the above and other objectives, features, and advantages of this application more obvious and understandable, the specific embodiments of this application are illustrated below.

BRIEF DESCRIPTION OF DRAWINGS

With reference to detailed descriptions in preferred embodiments in the following descriptions, various other advantages and benefits become clear to a person of ordinary skills in the art. The accompanying drawings are merely used to show the preferred embodiments, and are not considered as limitations to this application. Furthermore, in all of the accompanying drawings, the same parts are represented by the same reference numerals. In the drawings.

Figure 1:
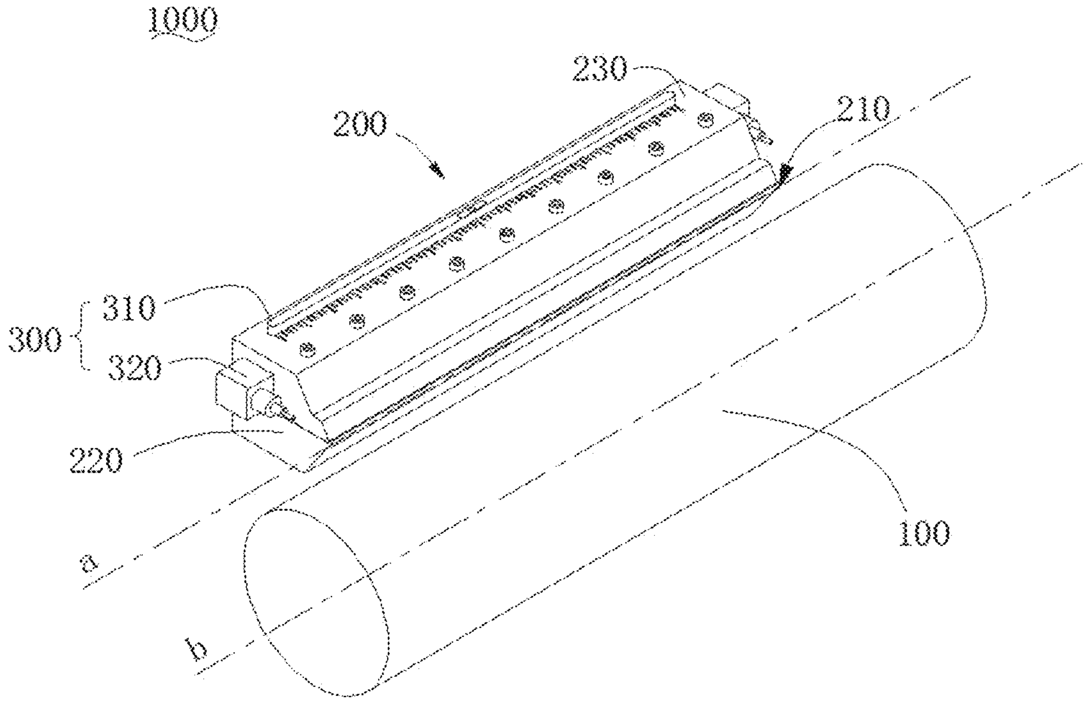
FIG. 1 is a structural schematic diagram of coating equipment according to an embodiment of this application.

Description of reference numerals: coating equipment 1000; back roll 100; coating die head 200; coating opening 210; detection assembly 300; level 310; range finder 320; end part 220; side surface 230; adjusting mechanism 400; machine frame 500; bearing plate 600; threaded piece 410; automatic control system 420.

DETAILED DESCRIPTION OF EMBODIMENTS

Embodiments of the technical solutions of this application will be described in detail below with reference to the accompanying drawings. The following embodiments are only used to more clearly describe the technical solutions of this application, and thus are merely exemplary and are not intended to limit the protection scope of this application.

Unless otherwise defined, all technical and scientific terms used in this specification have the same meanings as those generally understood by persons skilled in the technical field of this application. The terms used in this specification are only intended to describe the specific embodiments and are not intended to limit this application. The terms "comprising", "having" and any variations thereof in the description; the claims, and the description of the accompanying drawings of this application are intended to cover a non-exclusive inclusion.

In the description of the embodiment of this application, the technical terms "first", "second" and the like are used only for distinguishing different objects and cannot be interpreted as an indication or implication of relative importance or an implicit indication of the number, the specific order or the primary and secondary relationship of technical features. In the description of the embodiments of this application, "a plurality of" means two or more, unless otherwise specifically defined.

"Embodiment" mentioned herein means that the specific features, structures, or characteristics described with reference to the embodiments may be included in at least one embodiment of this application. This phrase that appears in various places of the specification does not necessarily refer to the same embodiment, and is not an independent or alternative embodiment mutually exclusive with other embodiments. It is understood explicitly and implicitly by those skilled in the art that the embodiments described herein can be combined with other embodiments.

In the description of the embodiments of this application, the term "and/or" merely describes the association relationship between the associated objects and indicates that there may be three relationships. For example, A and/or B may indicate three cases where only A exists, A and B exist at the same time, or only B exists. In addition, the character "l" herein generally indicates that the associated objects are in an "or" relationship.

In the description of the embodiments of this application, the term "a plurality of" refers to more than two (including two). Similarly. "multiple groups" refers to more than two groups (including two groups), and "multiple pieces" refers to more than two pieces (including two pieces).

In the description of the embodiments of this application, a direction or a positional relationship indicated by technical terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like is based on that shown in the accompanying drawings, is merely to describe the embodiments of this application and simplify the description and does not indicate or imply that the indicated device or component must have a special direction or is constructed and operated in a special direction, and thus cannot be understood as a limit of this application.

In the description of the embodiments of this application, unless otherwise specified and limited, technical terms "mounting", "connecting", "connection", "fixing" and the like should be understood in a broad sense, for example, they may be fixed connection, or may be detachable connection or be integrated, or may be mechanical connection, or may be electric connection, or may be direct connection, or may be indirect connection through an intermediate medium, or may be communication between interiors of two components, or may be an interactive relationship between two components. A person of ordinary skill in the art may understand specific meanings of the above-mentioned terms in the embodiments of this application based on the specific situation.

At present, from the development of the market situation, batteries are applied more and more widely. With the diversification of use scenarios and the more precise components inside the batteries, the production process of the batteries is particularly important. The coating process has a great influence on the production of batteries.

It should be noted that in the coating process of battery production, there are the following problems: on one hand, due to the characteristics of a rotary body of the back roll, the back roll is prone to circular runout in the production process, and if the too large circular runout of the back roll cannot be found and treated in time, a gap between the coating opening of the coating die head and the back roll will be unstable, thereby leading to the large fluctuation of coating weight; and on the other hand, if the parallelism of the coating die head relative to the back roll exceeding the specification cannot be found and treated in time, the coating weight will be difficult to be adjusted to a qualified level. Due to these problems, the coating stability cannot be ensured, and a base material is prone to scratching and breakage, thereby affecting the normal production of the coating equipment.

To solve the problem of poor coating stability caused by the fact that a gap and a parallelism of a coating die head relative to a back roll exceed specifications, the inventor found that a detection assembly may be arranged in the coating equipment, and the gap and the parallelism of the coating die head relative to the back roll are detected by the detection assembly in real time, so that the circular runout of the back roll and the change of the parallelism of the coating die head relative to the back roll can be found in time, so that a maintainer can deal with the problems.

Specifically, the detection assembly may be arranged on the coating die head, thereby monitoring the parallelism and the gap of the coating die head relative to the back roll at the same time. Once the parallelism and the gap exceed the standard, the parallelism and the gap can be stabilized to a qualified level through manual adjustment or closed-loop adjustment of an automatic system, thereby avoiding the waste of resources and productivity reduction caused by operations such as downtime investigation or frequent adjustment.

In view of this, embodiments of this application provide design of coating equipment. The coating equipment may include a back roll, a coating die head, and a detection assembly. The detection assembly may be configured to detect the position of the coating die head relative to the back roll.

The coating equipment provided by the embodiments of this application may be widely applied to the production of batteries, in particular, applied to the manufacturing of base materials of the batteries.

Referring to FIG. 1, FIG. 1 is a structural schematic diagram of coating equipment 1000 according to an embodiment of this application. The coating equipment 1000 provided by the embodiments of this application includes a back roll 100, a coating die head 200, and a detection assembly 300. The coating die head 200 has a coating opening 210 facing towards the back roll 100, and the coating opening 210 extends in an axial direction of the back roll 100. The detection assembly 300 is configured to detect the position of the coating die head 200 relative to the back roll 100.

The back roll 100 may be a rotatable rotary piece in the coating equipment 1000, a base material is wound on the back roll 100, and the back roll 100 in the coating equipment 1000 is configured to make the base material run stably. A structure of the back roll 100 may be symmetrical about a central axis of a cylinder, and a material of the back roll 100 may be cast steel, cast iron, and rubber, which will not be limited in the embodiments of this application.

Specifically, the coating equipment 1000 may be equipment for manufacturing a base material of a battery. The coating equipment 1000 may include a control center. The control center may be configured to receive various signals in the operation process of the coating equipment 1000 and give early warning to a maintainer or control various parts and devices in the coating equipment 1000 through closed-loop control of an automatic system.

The coating die head 200 may be a part for coating the base material in the coating equipment 1000. The coating die head 200 may be commercially available or customized. The embodiments of this application do not limit the specific model of the coating die head 200. The coating opening 210 is formed at one side, close to the back roll 100, of the coating die head 200. In the continuously running process of the base material, the coating die head 200 may continuously spray slurry through the coating opening 210 to coat the base material. The coating opening 210 may be rectangular or circular. "The coating opening 210 extends in an axial direction of the back roll 100" means that a length direction of the coating opening 210 is parallel to a central axis of the back roll 100.

The detection assembly 300 may be a device in the coating equipment 1000 for detecting the position change of the coating die head 200 and the back roll 100. A plurality of detection assemblies 300 may be provided. The plurality of detection assemblies 300 can improve the accuracy of the detection assemblies 300 and reduce measurement error. The detection assembly 300 may include a detection component, a sensor, and a structural part.

The detection component may detect the position change of the coating die head 200 and the back roll 100. The detection component may be a range finder 320 and a level 310. The embodiments of this application do not limit the type of the detection component, as long as the detection component can detect the position change of the die head and the back roll 100. The sensor may send detection and information back to the control center of the coating equipment 1000.

The structural part may be configured to mount the detection assembly 300 at other positions of the coating die head 200 or the coating equipment 1000. The detection assembly 300 may be mounted at any position, as long as the detection assembly 300 can detect the position change of the coating die head 200 and the back roll 100. The structural part may be a bracket or a sliding rail. The structural part may make the position of the detection assembly 300 changeable, thereby not affecting the operation on the coating die head 200 by a maintainer. In particular, when detecting the gap between the coating die head 200 and the back roll 100, the position-changeable detection assembly 300 may detect the imp between the coating die head 200 and the back roll 100 at different positions.

The detection assembly 300 may detect the position of the coating die head 200 relative to the back roll 100. It may be understood that many form and position tolerances, such as circular runout, parallelism, and position degree, are set between the coating die head 200 and the hack roll 100. The detection assembly 300 may detect all the position changes of the coating die head 200 and the hack roll 100, and feed these position changes back to the control center, so that the position change of the coating die head 200 and the back roll 100 is within the form and position tolerance, or that is, the position change of the coating die head 200 and the back roll 100 is within the specification.

In the coating equipment 1000 provided by the embodiments of this application, the level 310 arranged on the detection assembly 300 can detect the position change of the coating die head 200 relative to the back roll 100 in real time.

Continuously referring to FIG. 1, in some embodiments, the detection assembly 300 includes a level 310 mounted on the coating die head 200.

The level 310 may be commercially available or customized. The embodiments of this application do not limit the model of the level 310. Optionally, the level 310 may be mounted on a surface, different from the coating opening 210, of the coating die head 200. The level 310 may be fixed on the coating die head 200 through threaded connection, or may be movably mounted on the coating die head 200 through a structural part such as a bracket or a sliding rail. When the level 310 is movably mounted on the coating die head 200, the level 310 will not affect the operation on the coating die head 200 by the maintainer and the operation of recording data of the level 310.

In this way, the level 310 may detect the parallelism of the coating die head 200 relative to the back roll 100. When the parallelism is not within a tolerance range, a maintainer can perform maintenance in time, thereby ensuring the coaling stability and ensuring the normal operation of production.

Continuously referring to FIG. 1, in some embodiments, the detection assembly 300 includes a range finder 320. The range finder 320 is configured to detect a parallelism between a center line a of the coating opening 210 and a central axis b of the back roll 100.

The range finder 320 may be commercially available or customized. The embodiments of this application do not limit the model of the range finder 320. Specifically, a plurality of range finders 320 may be provided. For example, two, three, four or more range finders 320 may be provided. The plurality of range finders 320 may measure a gap distance of the coating die head 200 at different positions relative to the back roll 100. Taking the case where the coating opening 210 is rectangular as an example, the center line a of the coating opening 210 is a center line of the rectangle parallel to the back roll 100. The parallelism is a maximum allowable error value of parallelism of the central axis h of the back roll 100 relative to the center line a of the coating opening 210.

In this way, the range finder 320 may indirectly obtain the parallelism of the coating equipment 1000 relative to the back roll 100 by detecting the parallelism between the center line of the coating opening 210 and the central axis of the back roll 100. Compared with a method for detecting the parallelism of other positions, this measuring method has higher accuracy, is simple and convenient to operate, and can reduce the error during measurement and improve the measurement efficiency.

Figure 2:
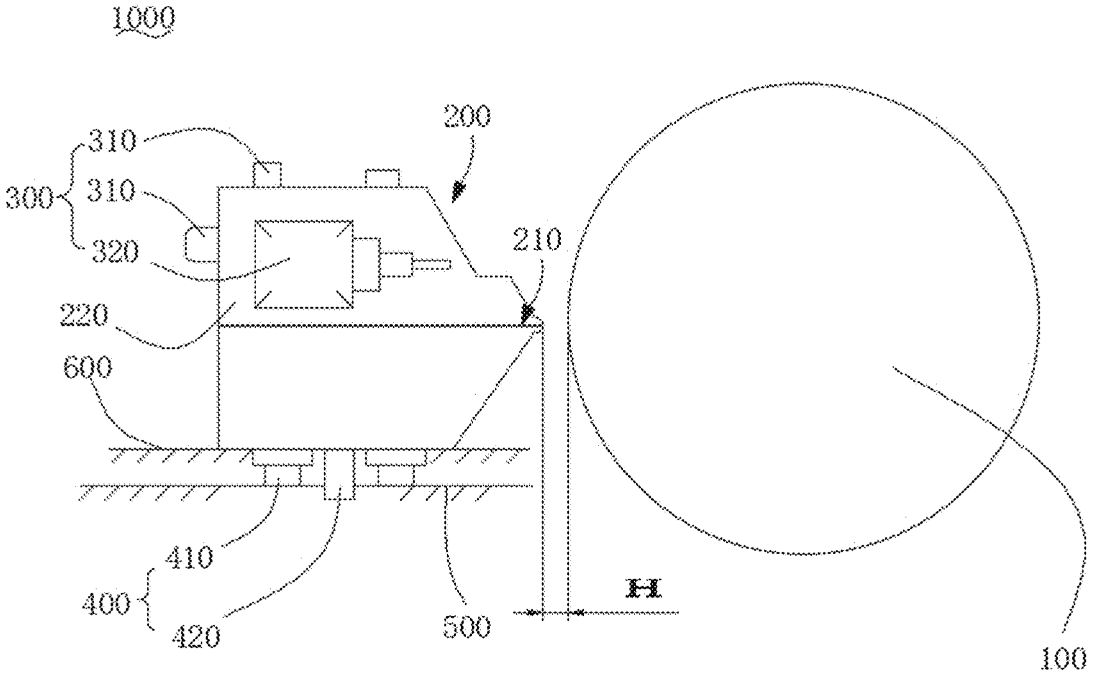
FIG. 2 is a structural schematic diagram of coating equipment according to an embodiment of this application.

Continuously referring to FIG. 1 and FIG. 2, FIG. 2 is a structural schematic diagram of coating equipment 1000 according to an embodiment of this application. In some embodiments, the range finder 320 is arranged on the coating die head 200. The range tinder 320 determines the parallelism by detecting a distance between the back roll 100 and the range finder 320.

Optionally, the range finder 320 may be mounted on a surface, different from the coaling opening 210, of the coating die head 200. The range finder 320 may be fixed on the coating die head 200 through threaded connection, or may be movably mounted on the coating die head 200 through a structural part such as a bracket or a sliding rail. When the range finder 320 is movably mounted on the coating die head 200, the range finder 320 will not affect the operation on the coating die head 200 by a maintainer and the operation of recording data of the range finder 320.

Taking two range finders 320 as an example, the two range finders 320 may be respectively arranged on two sides of the coating die head 200. The parallelism of the coating die head 200 relative to the back roll 100 can be obtained by comparing a distance H between the back roll 100 and the coating die head 200 measured by the two range finders 320. For example, when a given parallelism tolerance is 2 mm and if the distance H between the back roll 100 and the coating die head 200 measured by two range finders 320 is 50 mm and 0.50.5 mm respectively, it is considered that the parallelism of the coating die head 200 relative to the back roll 100 is within the specification; and if the distance H between the back roll 100 and the coating die head 200 measured by two range finders 320 is 50 mm and 54 mm respectively, it is considered that the parallelism of the coating die head 200 relative to the back roll 200 exceeds the specification. It should be noted that the above values are only examples for convenient understanding and cannot be regarded as limitations to the embodiments of this application.

In this way, the range finder 320 may detect the parallelism of the coating die head 200 relative to the back roll 100. When the parallelism is not within a tolerance range, a maintainer can perform maintenance in time, thereby ensuring the coating stability and ensuring the normal operation of production.

Figure 3:
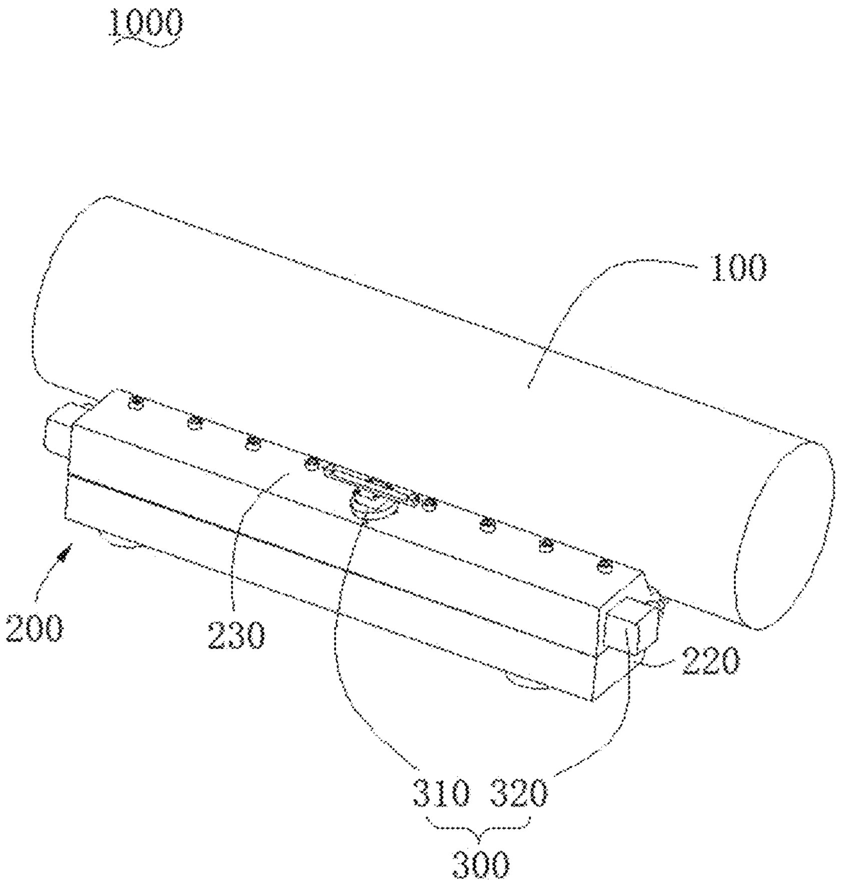
FIG. 3 is a structural schematic diagram of coating equipment according to an embodiment of this application.
Figure 4:
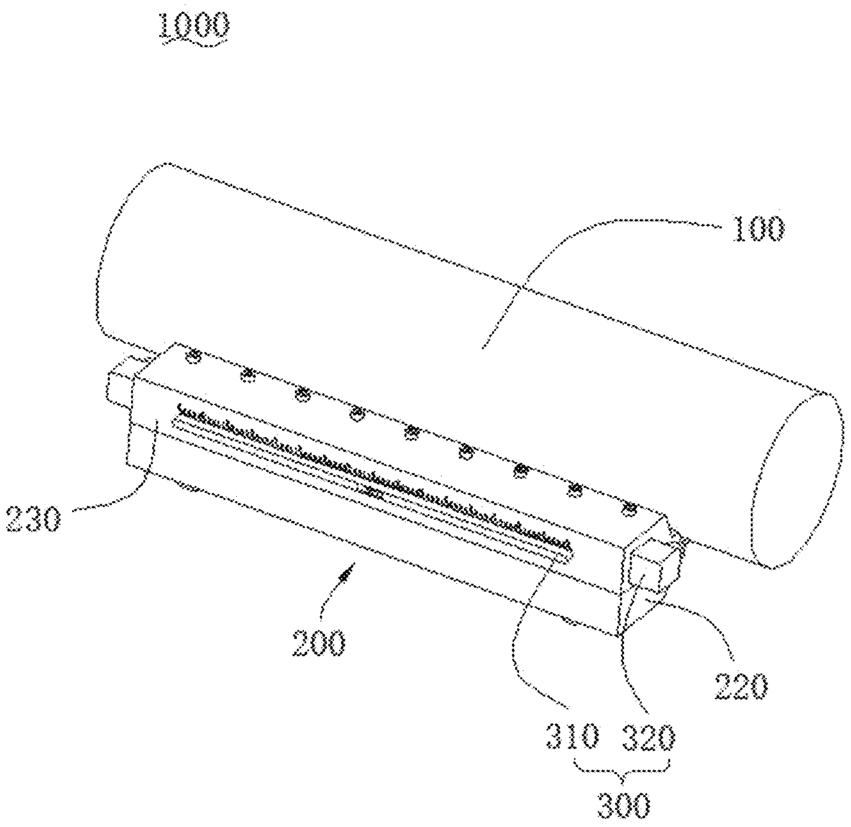
FIG. 4 is a structural schematic diagram of coating equipment according to an embodiment of this application.

Continuously referring to FIG. 1, FIG. 3 and FIG. 4, FIG. 3 is a structural schematic diagram of coating equipment 1000 according to an embodiment of this application, and FIG. 4 is a structural schematic diagram of coating equipment 1000 according to an embodiment of this application. In some embodiments, the range finder 320 and the level 310 are respectively located in different directions of the coating die head 200.

Exemplarily, the coating die head 200 may include a front side surface, a rear side surface, a left side surface, a right side surface, an upper side surface, and a lower side surface. The front side surface may be a surface facing the back roll 100, and the coating opening 210 may be formed on the front side surface. The range finder 320 and the level 310 may be respectively on surfaces, different from the front side surface, in other directions. For example, the range finder 320 may be arranged on the left side surface, and the level 310 may be arranged on the upper side surface, which will not be specifically limited by the embodiments of this application.

In this way, the range finder 320 and the level 310 are respectively arranged in different directions of the coating die head 200, so that interference between the range finder 320 and the level 310 can be avoided, and the measurement accuracy can be ensured.

Continuously referring to FIG. 1, FIG. 3 and FIG. 4, in some embodiments, the range finder 320 is arranged on an end part 220 in a length direction of the coating die head 200, the level 310 is parallel to the length direction of the coating die head 200, and the level 310 is mounted on a surface in the length direction of the coating die head 200.

Optionally, the case where the coating die head 200 has a cuboid-like structure is taken as an example. The length direction of the coating die head 200 is a direction of an edge where a height of the cuboid is located. At this time, the range finder 320 may be arranged in a direction where a top surface and a bottom surface of the cuboid are located, and the level 310 may be arranged in a direction where a side surface 230 of the cuboid is located.

In this way, the range finder 320 is arranged on the end part 220 in the length direction of the coating die head 200, and the level 310 is set to be parallel to the length direction of the coating die head 200. This design makes the distance between the range finder 320 and the level 310 farthest and facilitates the subsequent maintenance of the range finder 320 and the level 310, thereby avoiding interference between the range finder 320 and the level 310 and ensuring measurement accuracy.

Continuously referring to FIG. 1 and FIG. 2, in some embodiments, the range finder 320 is further configured to detect a gap between the coating opening 210 and the back roll 100.

Specifically, the range finder 320 may detect the gap between the coating opening 210 and the back roll 100 through laser ranging, ultrasonic ranging, and infrared ranging.

In this way, the range finder 320 detects the gap between the coating opening 210 and the back roll 100. When the gap between the back roll 100 and the coating opening 210 exceeds the specification, a maintainer can perform maintenance in time, thereby ensuring the coating stability and ensuring the normal operation of production.

Continuously referring to FIG. 1 and FIG. 2, in some embodiments, the coating equipment 1000 includes an adjusting mechanism 400 connected to the coating die head 200. The adjusting mechanism 400 is configured to adjust the position of the coating die head 200.

Specifically, the adjusting mechanism 400 may be connected to the coating die head 200 through bolt connection and welding, or may be connected through other manners. For example, a plate connected to the coating die head 200 may be provided, the plate may be linked with the coating die head 200, and the adjusting mechanism 400 adjusts the position of the plate so as to adjust the position of the coating die head 200.

The adjusting mechanism 400 may adjust the position of the coating die head 200 relative to the back roll 100. For example, the adjusting mechanism 400 may adjust the gap of the coating die head 200 relative to the back roll 100. For another example, the adjusting mechanism 400 may adjust the parallelism of the center line of the coating opening 210 relative to the central axis of the back roll 100. The adjusting mechanism 400 may adjust the position of the coating die head 200 through an adjusting bolt, air cylinder driving, and motor driving.

The cavity pressure inside the coating die head 200 may affect the flow rate of slum/ejected from each area of the coating opening 210; therefore, the adjusting mechanism 400 may adjust the flow rate of the slurry ejected from each area of the coating opening 210 by adjusting the cavity pressure inside the coating die head 200, thereby ensuring the coating stability. It may be understood that when the position of the coating die head 200 relative to the back roll 100 changes, although the flow rate of the slurry ejected from each area of the coating opening 210 is different, the position of the coating die head 200 relative to the back roll 100 in each area is different. For example, the distance between the coating die head 200 and two ends of a central axis b of the back roll 100 relative to the back roll 100 is different. Therefore, the spraying weight on the base material may be consistent, that is, the coating stability is ensured.

In this way, when the detection assembly 300 detects that the position of the coating die head 200 relative to the back roll 100 exceeds the specification, the adjusting mechanism 400 may be configured to adjust the position of the coating die head 200, so that the position of the coating die head 200 relative to the back roll 100 returns to the specification, thereby ensuring the coating stability and ensuring the normal operation of production.

Continuously referring to FIG. 1 and FIG. 2, in some embodiments, the coating equipment 1000 includes a machine frame 500 and a bearing plate 600, the coating die head 200 is mounted on the bearing plate 600, the adjusting mechanism 400 is mounted on the machine frame 500 and is connected to the bearing plate 600, and the adjusting mechanism 400 adjusts the degree of freedom of the bearing plate 600 in at least one direction to adjust the degree of freedom of the coating die head 200.

Specifically, the machine frame 500 is a main structural part of the coating die head 200, and the position of the machine frame 500 relative to the coating die head 200 is fixed. The coating die head 200 may be mounted on the bearing plate 600 through bolt connection and clamping connection. The adjusting mechanism 400 may be mounted on the machine frame 500 through bolt connection and clamping connection, and is connected to the bearing plate 600 through bolt connection and welding. The adjusting mechanism 400 may adjust the degree of freedom of the bearing plate 600 in an up-down direction, a left-right direction, and a front-back direction, so that when the gap or the parallelism of the coating die head 200 relative to the back roll 100 changes, a maintainer may adjust the gap or the parallelism to be within the specification by the adjusting mechanism 400, or may adjust the gap or the parallelism to be within the specification by a closed-loop automatic system.

In this way, compared with the method of directly mounting the adjusting mechanism 400 on the coating die head 200, the adjusting mechanism 400 is arranged on the bearing plate 600 and can adjust the degree of freedom of the coating die head 200 without changing the original structure of the coating die head 200.

Continuously referring to FIG. 1 and FIG. 2, in some embodiments, the adjusting mechanism 400 includes at least one of a threaded piece 410 and an automatic control system 420 that are connected to the bearing plate 600.

Specifically, the bearing plate 600 may be provided with a plurality of screw holes, and a plurality of threaded pieces 410 may be arranged in the screw holes. When the detection assembly 300 detects that a size such as the gap or the parallelism of the coating die head 200 relative to the back roll 100 exceeds the specification, on one hand, the detection assembly 300 can warn a maintainer in time, and the maintainer can adjust the size such as the gap or the parallelism of the coating die head 200 relative to the back roll 100 to be within the specification by adjusting the threaded pieces 410; and on the other hand, the detection assembly 300 can send detection information back to a control center, the control center sends an instruction to control the automatic control system 420 to drive the adjusting mechanism 400 to adjust the size such as the gap or the parallelism of the coating die head 200 relative to the back roll 100 to be within the specification. For example, the adjusting mechanism 400 may include a mechanical arm. After the automatic control system 420 receives the instruction, the automatic control system 420 may drive the mechanical arm to drive the bearing plate 600, so that the coating die head 200 mounted on the bearing plate 600 is linked; and the position of the coating die head 200 relative to the back roll 100 changes according to instruction information, thereby ensuring that the gap and the parallelism of the coating die head 200 relative to the back roll 100 are within the specification.

In this way, the threaded piece 410 may be adjusted manually and conveniently, and the manufacturing cost is low. The automatic control system 420 may adjust the position of the coating die head 200 in real time. The automatic control system 420 is more efficient and can ensure the normal operation of production to the greatest extent.

Continuously referring to FIG. 1 and FIG. 2, in one specific embodiment, coating equipment 1000 is provided. The coating equipment 1000 provided by the embodiments of this application includes a back roll 100, a coating die head 200, and a detection assembly 300. The detection assembly 300 may be mounted at a position where the gap and the parallelism of the coating die head 200 relative to the back roll 100 can be detected conveniently, and the adjusting mechanism 400 is arranged at the periphery of the coating die head 200, so that the position of the coating die head 200 relative to the back roll 100 can be adjusted, thereby solving the problem of poor coating stability caused by the fact that the gap and the parallelism of the coating die head 200 relative to the back roll 100 exceed the specification.

Finally, it should be noted that the foregoing embodiments are merely intended for describing the technical solutions of this application, but not for limiting this application. Although this application is described in detail with reference to the foregoing embodiments, those of ordinary skill in the art should understand that they may still make modifications to the technical solutions described in the foregoing embodiments or make equivalent replacements to some or all technical features thereof; and these modifications or replacements do not make the essence of the corresponding technical solution depart from the scope of the technical solutions of the embodiments of this application, and should fall within the scope of claims and specification of this application. In particular, as long as there is no structural conflict, the technical features in the embodiments can be combined in any way. This application is not limited to the specific embodiments disclosed herein, but includes all technical solutions falling within the scope of the claims.

What is claimed is:

1. Coating equipment, comprising:

a back roll;

a coating die head, having a coating opening facing towards the back roll, the coating opening extending in an axial direction of the back roll; and a detection assembly, configured to detect a position of the coating die head relative to the back roll and comprising a level mounted on the coating die head, wherein the detection assembly comprises two range finders, and the range finders are configured to detect a parallelism between a center line of the coating opening and a central axis of the back roll;

wherein the range finders are arranged on the coating die head, and the range finders determine the parallelism by detecting a distance between the back roll and the range finders; and wherein the range finders are arranged on both end parts in a length direction of the coating die head, the level is parallel to the length direction of the coating die head, and the level is mounted on a surface in the length direction of the coating die head.

2. The coating equipment according to claim 1, wherein the range finders and the level are respectively located in different directions of the coating die head.

3. The coating equipment according to claim 1, wherein the range finders are further configured to detect a gap between the coating opening and the back roll.

4. The coating equipment according to claim 1, further comprising an adjusting mechanism connected to the coating die head, and the adjusting mechanism is configured to adjust the position of the coating die head.

5. The coating equipment according to claim 4, further comprising a machine frame and a bearing plate, the coating die head is mounted on the bearing plate, the adjusting mechanism is mounted on the machine frame and is connected to the bearing plate, and the adjusting mechanism adjusts a degree of freedom in at least one direction of the bearing plate to adjust a degree of freedom of the coating die head.

6. The coating equipment according to claim 5, wherein the adjusting mechanism comprises at least one of a threaded piece and an automatic control system that are connected to the bearing plate.

7. The coating equipment according to claim 4, wherein the adjusting mechanism is configured to adjust the gap between the coating die head and the back roll.

* * * * *